Patented Oct. 28, 1924.

1,513,566

UNITED STATES PATENT OFFICE.

HUGH McCURDY SPENCER, OF NEWARK, NEW JERSEY, ASSIGNOR TO SEYDEL CHEMICAL COMPANY, A CORPORATION OF NEW JERSEY.

ALUMINA COAGULANT.

No Drawing.    Application filed October 10, 1922.  Serial No. 593,640.

*To all whom it may concern:*

Be it known that I, HUGH McCURDY SPENCER, a citizen of the United States, residing at Newark, in the county of Essex, State of New Jersey, have invented certain new and useful Improvements in Alumina Coagulants; and I do hereby declare the following to be a full, clear, and exact description of the invention, such as will enable others skilled in the art to which it appertains to make and use the same.

This invention relates to the purification of liquids and solutions and particularly to the purification of water for industrial and municipal use and has for one of its principal objects the more efficient and convenient removal of suspended or colloidal matter from such liquids by means of an improved allumina-containing coagulant or precipitating agent. Another object is to facilitate the efficient filtration, centrifugation, etc. of finely suspended or colloidal solids or liquids in a liquid medium.

Hitherto in the purification of water by methods involving the use of aluminum compounds, the usual practice has been to add the aluminum compound to the raw or treated water in the form of commercial aluminum sulfate or frequently as ordinary alum. If the water is very alkaline copperas is also sometimes added, for the reason that the gelatinous precipitate of ferric hydroxide resulting from the action of the copperas on the water is less soluble in alkaline waters than is aluminum hydroxide, the ferric hydroxide taking the place of the portion of alumina re-dissolved by the excess alkali. After sufficient time has been allowed for the reaction between the aluminum compound and the alkalis of the water to take place, to produce a precipitate of hydrated alumina, the water is ordinarily filtered (by methods already well-known in the art) whereby the precipitated alumina, along with the suspended and colloidal matter originally present in the water is removed, producing a clarified water. If desired, the clarified water from the filtering operation may then be subjected to any further suitable treatment, as with water softening agents or sterilizing agents, septic tank treatment, or other suitable agencies to complete the purification, all according to well known procedures.

The reaction between the aluminum salt and the bases in the water ordinarily requires a considerable length of time and for this reason storage tanks of very large capacity are usually employed to permit storage of the water while the reaction is taking place and before passing the water to the filters.

If the raw water is acid it must be rendered alkaline before adding the sulfate of alumina, otherwise the hydrated alumina will not be precipitated at all, or at least ordinarily it will not be precipitated in sufficient amounts to aid in the filtering operation to bring about an effective precipitation of suspended and colloidal impurities. The basic compounds ordinarily employed for neutralizing the acid of the raw waters to render them alkaline are lime, caustic soda or soda ash.

In the purification of industrial waste waters such as the waste liquors from tanneries, wood pulp waste-liquors, etc., lime containing compounds are frequently used in connection with the various other treatments all directed to the purification of these waste waters to a sufficient extent to promote their introduction into streams and rivers without polluting the same. In all of these instances where an aluminum compound is employed as a coagulating or precipitating reagent, either alone or in connection with other reagents such as lime, copperas, etc., the reaction of the water before the addition of the aluminum compound must be carefully adjusted. That is to say, the raw water before treatment with the aluminum compound must either be alkaline to begin with or must be rendered so by the addition of suitable reagents as previously mentioned. On the other hand, a raw water which is originally too alkaline, or which has been rendered so by treatment will retard the precipitation of the hydrated alumina and thus render the precipitating action of the aluminum salt less effective to a greater or less degree. This necessary preliminary treatment or control of the alkalinity of the raw water constitutes one of the most troublesome of the many serious difficulties encountered in the application of alumina coagulants in the purification of water according to the methods hitherto in use and one of the principal objects of the present invention is to provide an alumina-containing coagulant which shall be effective in many more instances than hitherto in removing suspended and colloidal impurities from the water without the necessity of subjecting the raw water to a preliminary treatment to control and regulate the alkaline reaction prior to the addition of the alumina-coagulant.

Also, as already mentioned, among the other serious difficulties hitherto met with in the application of alumina-coagulants has been the necessity for the prolonged storage of the water during the time required for the coagulating action of the aluminum compound to complete itself. The large storage and settling basins required for this purpose add materially to the cost and inconvenience of treating waters by this method, and the overcoming or lessening of this difficulty constitutes a second very important object of my invention.

These and other desirable objectives are accomplished in accordance with the present invention in an economical and convenient manner, by providing an alumina-containing coagulant of such character that when added in relatively small amounts to a relatively large volume of water, hydrated alumina is at once precipitated in a form which carries down the impurities with it and also which can be readily removed by the usual methods of filtration and, furthermore, this highly advantageous result is attained with a great variety of raw waters, industrial waste liquors, and other liquids of widely varying nature and characteristics without preliminary treatment.

More specifically, these advantageous results are accomplished by providing, in the preferred form of the invention a concentrated alumina-containing coagulant which is very nearly neutral or slightly acid in reaction, and in which the hydrated alumina is present, not in a precipitated or gelatinous form as would naturally be expected with neutralized or partially neutralized aluminum salts under ordinary circumstances, but in which it is present in a dissolved or partially dissolved state or colloidal condition from which state it does not separate to any objectionable extent even when allowed to stand for considerable periods of time. When, however, this improved coagulant is diluted to any considerable extent, as for example when it is added to the water to be purified, the alumina content, as mentioned, readily passes into the form of a gelatinous coagulum or precipitate carrying the suspended and colloidal impurities, bacteria, etc., along with it.

This action is the more remarkable, since, as is well-known, when a solution containing an aluminum salt is gradually neutralized by caustic soda, for example to reduce the acidity of the solution a portion of the alumina in the solution will first separate (as the neutralizing agent is added) in the form of a gelatinous precipitate or coagulum, and then completely re-dissolve as excess is added. In other words when the ordinary method of neutralizing or precipitating alumina-containing solutions is employed (as one would normally be led to practice) it is not possible or practicable to obtain a partially or nearly neutralized or slightly acid alumina-containing solution without, at the same time, obtaining a precipitate of a considerable portion of the alumina content. But by employing the process and means of the present invention, such a partially or nearly neutralized or slightly acid concentrated solution of an aluminum compound can be obtained without obtaining any objectionable precipitate or coagulate of the alumina. That is to say, as a certain neutral point or iso electric point is approached or almost reached, the solution remains or becomes mechanically homogeneous in character (that is, there is no objectionable precipitation) and shows usually only a slight turbidity or milkiness due to the formation of hydrated alumina in a highly disseminated or colloidal condition in the liquid.

The preferred reagent employed to produce this result in accordance with the present invention, is a basic salt of a strong base and a weak acid, such for example as sodium carbonate or bi-carbonate or similar alkali metal carbonate or carbonate of ammonium, normal sodium sulphite, di-sodium hydrogen phosphate, etc. By basic salt, in this connection I mean a salt which has a sufficiently strong basic strength to reduce the acidity of a solution of an aluminum salt to the degree specified. In other words I believe that the acid of the basic salt must be replaceable to a substantial extent by the acid of the aluminum salt, and that this acid must be capable of peptizing the hydrated alumina but not strong enough to completely dissolve or chemically combine with the alumina to form a stable compound therewith in solution or cause it to precipitate.

It will also be seen that the present invention in one of its aspects provides for the purification of water through the agency of an aluminum salt and a basic compound, not by adding the basic compound to the water prior to the treatment of the water with the aluminum compound as in the usual methods, but, on the contrary, by providing for the addition of the basic compound to a concentrated solution containing the aluminum salt and then the addition of this mixture to the water or solution to be purified.

One of the important and unexpected advantages obtained by this procedure, as already mentioned, is the shortening of the time required for the formation of the gelatinous precipitate or coagulum of hydrated alumina. Another advantage is the elimination, in many instances, of the necessity of subjecting acid waters to a neutralizing treatment before adding the alumina-coagulant. The precipitation referred to occurs even when the water to be treated contains free acid in an amount chemically equivalent to the alumina-content of the coagulant or aluminum salt, whereas if the equivalent amount of base were first added to the water to neutralize the acid content thereof, in accordance with older practice, the precipitation of hydrated alumina would frequently either not take place at all or else would be retarded to such an extent that a long period of time would be required to bring about the desired precipitation, with the accompanying disadvantages as to the storage tanks and time of treatment referred to above.

While I do not wish to restrict the scope of my invention by any unwarranted assumption or explanations as to the exact chemical reactions or other changes which take place either during the preparation of my improved coagulant or during the action of the latter upon the water, nevertheless, I believe that the formation of the improved coagulant in accordance with the method of the present invention is due in part at least to a peptization or partial solubilization of the hydrated alumina precipitate or coagulum by the carbonic acid or other similar weak acid which is formed when the solution containing the aluminum salt is neutralized by sodium carbonate or like salt of a strong base and a weak acid. Also this is the explanation, I believe, of the fact, for example that I may prepare my improved coagulant in one of its forms by first precipitating hydrated alumina from a solution of an aluminum salt by means of caustic soda and then passing carbon dioxide through the mixture thus obtained, or otherwise adding a suitable weakly acidic substance until the coagulated or precipitated hydrate of alumina is peptized or partially solubilized to produce a liquid containing the hydrated alumina in colloidal or partially solubilized condition such that when diluted it readily decomposes to again reproduce the precipitate or coagulum of hydrated alumina.

The formation of a satisfactory precipitate of hydrated alumina in accordance with the method of the present invention, even in the presence of an amount of acid equivalent or nearly equivalent to the total alumina added, is due also, I believe, in part at least to the dilution of the weak acid or other peptizing agent which is present in the coagulant in relatively high concentrations, and in part to the slowness with which the precipitated or coagulated hydrated alumina reacts with the dilute solution of acid already present in the water. Another feature of the present invention which contributes to this same result is the greater ease with which the improved alumina-containing coagulant is hydrolized when diluted. The improved coagulant is adjusted with respect to its hydrolizable properties in such way that it is readily decomposed upon dilution to form a gelatinous precipitate of aluminum hydroxide, whereas the aluminum salts, solutions and compounds hitherto used for this purpose, being more stable in their reaction toward water, are more difficult to hydrolize or decompose in this manner.

Having described the main general features and characteristics of my invention, I wish now to give a few specific examples of my improved coagulant and method of making and using the same. It is to be understood, however, that my invention is not restricted to the details given in these examples but that they are given merely by way of illustrating a few embodiments of my invention:

*Example 1.*—Run 240 pounds of water into a steam jacketed kettle that is lined with enamel or stoneware or any other substance that is not attacked by sulphate of alumina. Bring the water to a boil and add to it 286 pounds of commercial sulphate of alumina that is either iron free or not, as the case may be. The iron free is preferred for drinking water clarification. Stir until the sulphate of alumina has completely dissolved. Allow this solution to cool to room temperature, or else cool it artificially by pipe coils or by admitting cold water into the jacket. Add, little by little and with constant stirring, 72 pounds of finely powdered commercial soda-ash. The soda-ash should not be added too quickly since this will cause too rapid frothing due to the decomposition of the soda-ash by the sulphate of alumina and the solution is apt to foam over. Allow the solution to stand over night, after which it is ready for use.

The above formula may be varied by using the proportions of 800 parts water, 800 parts commercial sulphate of alumina, and 200 parts soda-ash. Also the soda-ash may be dissolved in water and the sulphate of alumina added in the proportions given in Example 1. However, this last method is troublesome because aluminum hydrate will not redisperse until practically all the soda has been neutralized and the solution has become acid. Hence the rule to follow is to add the soda to the sulphate of aluminum and not vice versa. In conclusion it must be remembered that the amount of soda can be in any degree less than that given in Example 1, but it should not be much more than the amount indicated because if the solution crosses the iso-electric point precipitation of aluminum hydrate occurs which is not redispersable unless the solution is again rendered acid by the addition of more sulphate of alumina or some acid.

*Example 2.*—Follow the procedure substantially as described in Example 1, substituting a sufficient amount of normal sodium sulphite ($Na_2SO_3$) for the sodium carbonate used in Example 1 to peptize or partially redissolve the precipitate of hydrated alumina first formed to bring the alumina into substantially the same dispersed state or colloidal condition as in the end product of Example 1.

*Example 3.*—Follow the procedure substantially as described in Example 1, substituting a sufficient amount of di-sodium hydrogen phosphate ($Na_2HPO_4 12H_2O$) for the sodium carbonate used in Example 1 to peptize or partially redissolve the precipitate of hydrated alumina first formed to bring the alumina into substantially the same dispersed state or colloidal condition as in the end product of Example 1.

In applying the improved coagulant prepared in accordance with the foregoing example to the clarification of industrial waste liquors, the amount of my improved coagulant which should be used varies considerably according to the character of the liquor being treated and the amount of solid matter already present, but I have obtained good results in the clarification of certain wasteliquors by adding the colloidal coagulant prepared as described in this example in amounts corresponding to one-half of one percent to one percent by weight of the water or waste-liquors treated.

I claim:

1. An improved coagulant for clarifying aqueous liquids comprising a liquid containing hydrated alumina in a peptized state.

2. An improved coagulant for clarifying aqueous liquids comprising a liquid containing hydrated alumina in a peptized state in relatively high concentration.

3. An improved coagulant for clarifying aqueous liquids comprising a liquid containing hydrated alumina, the hydrated alumina being present in the liquid in such condition that it is readily precipitatable from the liquid when the liquid is diluted with water.

4. An improved coagulant for clarifying aqueous liquids comprising a solution of an aluminum salt which has been partially neutralized, the partially neutralized solution being substantially homogeneous with respect to the hydrated alumina contained therein.

5. An improved alumina-containing coagulant for clarifying aqueous liquids comprising a partially neutralized solution of a salt of aluminum and a peptizing agent capable of peptizing hydrated alumina, the coagulant being substantially homogeneous with respect to the hydrated alumina contained therein.

6. An improved alumina-containing coagulant for clarifying aqueous liquids comprising a partially neutralized solution of a salt of aluminum and a weakly acidic peptizing agent for the alumina, the coagulant being substantially homogeneous with respect to the hydrated alumina contained therein.

7. An improved alumina-containing coagulant for clarifying aqueous liquids comprising a partially neutralized solution of a salt of aluminum and a carbonic acid peptizing agent, the liquid coagulant being substantially homogeneous with respect to the hydrated alumina contained therein.

8. An improved alumina-containing coagulant for clarifying aqueous liquids comprising a partially neutralized solution of a salt of aluminum, the solution being substantially acid in its reaction toward indicators of the class (with respect to sensitiveness) to which litmus belongs, and being substantially homogenous with respect to the alumina contained therein.

9. An improved alumina-containing coagulant for clarifying aqueous liquids comprising a partially neutralized solution of a salt of aluminum, the solution being acid in its reaction toward indicators which show a color change between a concentration of hydrogen ion corresponding to a $p_H$ value of about 5 and a concentration of hydrogen ion corresponding to a $p_H$ value of about 6½.

10. An improved alumina-containing coagulant for clarifying aqueous liquids comprising a concentrated solution of an aluminum salt which has been almost completely neutralized by the addition thereto of a basic salt of a strong base and a weak acid.

11. An improved alumina-containing coagulant for clarifying aqueous liquids comprising a concentrated solution of an aluminum salt which has been almost completely neutralized by the addition thereto of a carbonate of an alkali metal.

12. The method of preparing an alumina-containing coagulant for purifying aqueous liquids which comprises subjecting a solution of an aluminum salt to the action of a carbonate of an alkali metal in amount sufficient to peptize the hydrate of alumina formed.

13. The method of preparing an alumina-containing coagulant for purifying aqueous liquids which comprises subjecting a solution of an aluminum salt to the action of the carbonate of an alkali metal in such amount as to produce a stable dispersion of hydrated alumina in the liquid.

14. The method of preparing an alumina-containing coagulant for clarifying aqueous liquids which comprises subjecting a solution of an aluminum salt to the action of a hydroxide of an alkali metal and carbon dioxide as a peptizing agent for the alumina.

15. The method of preparing an improved alumina-containing coagulant for purifying and clarifying aqueous liquids which comprises subjecting a solution of an aluminum salt to the action of a carbonate of an alkali metal in increasing amounts, with stirring, at ordinary temperatures until the hydrated alumina which first precipitates partially redissolves and the solution becomes opalescent due to the formation of a stable colloidal solution of hydrated alumina.

16. The method of preparing an improved alumina-containing coagulant for clarifying aqueous liquids which comprises subjecting a solution of an aluminum salt to the action of a carbonate of an alkali metal in amounts such that the solution is no longer acid in reaction toward indicators having a sensitiveness about equal to about that of methyl orange, but such that it remains acid toward indicators having a sensitiveness about equal to about that of litmus.

17. The method of purifying aqueous liquids to remove suspended impurities therefrom, which comprises subjecting the liquid to the action of a solution of a salt of aluminum which concentrated solution has been previously partially neutralized by means of a carbonate of an alkali metal.

18. The method of purifying water to remove suspended impurities therefrom which comprises subjecting water to the action of a concentrated colloidal solution of hydrated alumina.

19. The method of purifying water to remove suspended and colloidal impurities therefrom, which comprises subjecting the water to the action of a solution of an aluminum salt which is sufficiently basic in its reaction to turn methyl orange indicator from pink to yellow, but which does not contain more than sufficient base to produce this color reaction and which also contains dissolved carbon dioxide whereby the hydrated alumina which otherwise would be precipitated under these conditions is peptized and rendered sufficiently soluble to prevent its precipitation until diluted.

20. An improved alumina-containing coagulant for purifying water by the removal of suspended and colloidal impurities therefrom which comprises a homogeneous liquid containing an aluminum salt and less than an equivalent amount of a carbonate of an alkali metal.

21. The method of purifying water, which comprises subjecting the water to the action of a solution prepared from an aluminum salt and less than an equivalent amount of a carbonate of an alkali metal containing hydrated alumina in a peptized state in high concentration.

22. The method of preparing an improved alumina-containing coagulant for purifying water by the removal of suspended and colloidal impurities therefrom which comprises subjecting a concentrated solution of a salt of aluminum to the action of less than an equivalent amount of a basic salt of a strong base and a weak acid.

23. The method of preparing an improved alumina-containing coagulant for purifying water, which comprises subjecting a concentrated solution of an aluminum salt to the action of less than an equivalent amount of a carbonate of an alkali metal.

24. The method of preparing an alumina-containing coagulant for purifying water which comprises subjecting a solution containing a salt of aluminum to the action of less than an equivalent amount of an hydroxide of an alkali metal and carbon dioxide as a peptizing agent for the alumina.

25. The method of preparing an alumina-containing coagulant for purifying water, which comprises subjecting a solution containing a salt of aluminum to the action of less than that amount of an hydroxide of an alkali metal which is sufficient to completely redissolve the precipitate of hydrated alumina first formed, and then subjecting the liquid to the action of carbon dioxide gas.

26. The method of preparing an alumina-containing coagulant for purifying water, which comprises subjecting a solution containing a salt of aluminum to the action of an amount of carbonate of an alkali metal which is insufficient to produce a permanent precipitate of hydrated alumina, but which is sufficient to produce a permanent turbidity therein due to hydrated alumina.

27. The method of preparing an alumina-containing coagulant for purifying water, which comprises subjecting a solution containing a salt of aluminum to the action of a sufficient amount of a carbonate of an alkali metal to reduce the acid reaction of the solution to about that of a saturated solution of carbonic acid gas.

28. The method of purifying water by means of an aluminum salt and a base which comprises mixing the base with a concentrated solution of the aluminum salt then subjecting a relatively large volume of the water to be purified to the action of the mixture of the aluminum salt and base.

29. The method of purifying water by means of an aluminum salt and a carbonate of an alkali metal which comprises mixing a relatively concentrated solution of the aluminum salt with the carbonate of the alkali metal and then subjecting a relatively large volume of the water to be purified to the action of the mixture of the aluminum salt and carbonate.

30. The method of preparing an improved alumina-containing coagulant for clarifying aqueous liquids which comprises partially neutralizing a solution of an aluminum salt by means of a basic salt of a strong base and a very weak acid.

31. The method of purifying water by means of an aluminum salt and a base which comprises partially neutralizing a concentrated solution of the aluminum salt with the base and then subjecting a relatively large volume of the water to be purified to the action of the partially neutralized solution.

32. The method of purifying water by means of an aluminum salt and a carbonate of an alkali metal which comprises partially neutralizing a relatively concentrated solution of the aluminum salt with the carbonate of the alkali metal and then subjecting a relatively large volume of the water to be purified to the action of the partially neutralized solution.

In testimony whereof I affix my signature.

HUGH McCURDY SPENCER.